(12) United States Patent
Fujita et al.

(10) Patent No.: US 7,082,357 B2
(45) Date of Patent: Jul. 25, 2006

(54) FAILURE DIAGNOSIS METHOD OF VEHICLE COMMUNICATION NETWORK

(75) Inventors: Hirohisa Fujita, Chita-gun (JP); Nobuhiko Makino, Anjo (JP); Masayasu Kato, Nagoya (JP); Toyoharu Katsukura, Kariya (JP)

(73) Assignees: Advics Co., Ltd., Kariya (JP); Denso Corporation, Kariya (JP)

( * ) Notice: Subject to any disclaimer, the term of this patent is extended or adjusted under 35 U.S.C. 154(b) by 33 days.

(21) Appl. No.: 10/759,117

(22) Filed: Jan. 20, 2004

(65) Prior Publication Data

US 2004/0153223 A1     Aug. 5, 2004

(30) Foreign Application Priority Data

Jan. 31, 2003    (JP) .............................. 2003-023647

(51) Int. Cl.
*H02H 5/04*   (2006.01)
*H04J 3/26*   (2006.01)

(52) U.S. Cl. ........................... 701/29; 701/32; 324/384

(58) Field of Classification Search ............... 701/29, 701/32, 33; 307/10.1, 31; 714/822; 361/62, 361/63; 324/384, 383, 402, 503
See application file for complete search history.

(56) References Cited

U.S. PATENT DOCUMENTS

| | | | | |
|---|---|---|---|---|
| 4,939,725 A | * | 7/1990 | Matsuda et al. ............. | 370/445 |
| 5,343,472 A | * | 8/1994 | Michihira et al. ........... | 370/445 |
| 5,408,412 A | * | 4/1995 | Hogg et al. .................... | 701/33 |
| 5,818,673 A | * | 10/1998 | Matsumaru et al. .......... | 361/63 |
| 6,091,711 A | * | 7/2000 | Fukuda ........................ | 370/242 |
| 6,534,883 B1 | * | 3/2003 | Yoshida et al. ............. | 307/10.1 |

FOREIGN PATENT DOCUMENTS

JP    A-2002-091549    3/2002

* cited by examiner

*Primary Examiner*—Dalena Tran

(74) *Attorney, Agent, or Firm*—Posz Law Group, PLC

(57) ABSTRACT

When a resistance value of a CAN bus main line is 60 Ω, the CAN bus main line is in a normal state. However, the resistance value thereof differs depending on an abnormality portion when an abnormality such as disconnection, short circuit, or the like has occurred in it or a branch line. Therefore, the abnormality portion can be identified depending on the measured resistance value.

In addition, a failure diagnosis portion of an ECU stores different diagnosis trouble codes in the memory for the following cases; when an abnormality has occurred in the CAN bus communication, when various sensors are malfunctioning, and when an abnormality such as disconnection has occurred in a communication line that is connected to the various sensors. Accordingly, the resistance value of the CAN bus main line is measured, and the abnormality portion can be identified by a combination of the resistance value and the diagnosis trouble code.

4 Claims, 4 Drawing Sheets

| ABNORMALITY CODE |
|---|
| U01 MALFUNCTION IN CAN COMMUNICATION |
| U02 MALFUNCTION IN CAN COMMUNICATION WITH STEERING ANGLE SENSOR |
| U03 MALFUNCTION IN CAN COMMUNICATION WITH YAW RATE SENSOR |
| C01 MALFUNCTION IN STEERING ANGLE SESOR |
| C02 MALFUNCTION IN YAW RATE SESOR |

FIG.2

RELATIONSHIP BETWEEN RESISTNCE VALUE OF
CAN BUS MAIN LINE AND ABNORMALITY CODES

○ DIAGNOSIS TROUBLE CODE IS OUTPUT
× DIAGNOSIS TROUBLE CODE IS NOT OUTPUT

| RESISTANCE VALUE | DIAGNOSIS TROUBLE CODE | | ABNORMALITY PORTION |
|---|---|---|---|
| 120Ω | U01 | ○ | (1) |
| | U02 | ○ | (1) |
| | U03 | ○ | (1) |
| 0Ω | U01 | ○ | IDENTIFICATION OF SHORT CIRCUIT PORTION BY REMOVING EACH SENSOR AND ECU DIAGNOSIS TROUBLE CODE INCLUDING U01 U02 AND U03 IS OUTPUT |
| | U02 | | |
| | U03 | | |
| ∞ | U01 | × | (3) |
| | U02 | × | (3) |
| | U03 | × | (3) |
| 60Ω | U01 | × | — |
| | U02 | ○ | (2) |
| | U03 | ○ | (4) |

FIG.4

FAILURE DIAGNOSIS METHOD OF VEHICLE COMMUNICATION NETWORK

CROSS REFERENCE TO RELATED APPLICATION

This application is based upon and claims the benefit of Japanese Patent Application No. 2003-23647 filed on Jan. 31, 2003, the content of which are incorporated herein by reference.

FIELD OF THE INVENTION

The present invention relates to a failure diagnosis method of a communication network for a vehicle that is formed by a plurality of electronic control instruments and electronic control devices that are mounted on a vehicle such as an automobile, being connected to a multiplex communication line.

BACKGROUND OF THE INVENTION

A related art is disclosed in Japanese Patent Publication 2002-91549 which is a failure diagnosis device of an electronic control system for a vehicle. This failure diagnosis device has a signal analysis portion for analyzing communication signal information that is received through an input portion provided in the failure diagnosis device from a multiplex communication line to which a plurality of electronic control related members are connected.

The signal analysis portion includes a first failure region identification portion that identifies an area with a possibility of failure in a multiplex communication system such as a sensor failure, or the like based on whether or not communication is performed by the plurality of electronic control related members using the received communication signal information; and a second failure region identification portion that identifies an electronic control related member with a possibility of failure out of the plurality of electronic control related members based on data contents of the communication signal that is obtained from the communication signal information.

Accordingly, it is possible to identify the area with a possibility of failure in the multiplex communication system, and the electronic control related member with a possibility of failure out of the plurality of electronic control related members.

However, in the related art as disclosed above, for example, when it is determined that there is an abnormality with the multiplex communication system, the abnormality portion of the multiplex communication system cannot be identified. That is, the first failure region identification portion performs failure diagnosis for the entire multiplex communication system. Therefore, only a board failure region such as a sensor failure, or the like can be identified, and a determination cannot be made what kind of abnormalities has occurred at which portion of the multiplex communication system. (It is not possible to determine whether an abnormality has occurred in a main line of the multiplex communication line, or a branch line that is wired from the main line to the electronic control related members, and in the latter case at which a branch line abnormality has occurred.)

SUMMARY OF THE INVENTION

The present invention is made in view of the foregoing circumstances, and it is an object of the present invention to provide a failure diagnosis method of a communication network for a vehicle that is easily capable of identifying an abnormality portion when failure (abnormality) occurs in the communication network.

According to the present invention, when failure has occurred in an electronic control instrument and when an abnormality including disconnection or short circuit has occurred in the communication line from a main line to a branch line that is connected to the electronic control instrument of the multiplex communication line, different diagnosis trouble codes are stored at the failure diagnosis portion of an electronic control device of the present invention. Further, a resistance value of the main line of the multiplex communication line is measured, and an abnormality portion in the communication network is identified by a combination of the measured resistance value of the main line and the diagnosis trouble code that is stored in a failure diagnosis portion.

When an abnormality such as disconnection, short circuit, or the like has occurred in the main line or the branch line that is connected from the main line to the electronic control instrument of the multiplex communication line, main line resistance of the multiplex communication line differs depending on the abnormality portion thereof. Furthermore, when an abnormality has occurred, if the code that differs depending on an abnormality state is stored in the failure diagnosis portion, failure state is identified. For this reason, depending on the combination of the resistance value of the main line resistance and the diagnosis trouble code, disconnection of the main line of the multiplex communication line, disconnection of the branch line that is connected from the main line to the electronic control instrument, short circuit of the main line, the short circuit of the branch line, or the like can be identified.

BRIEF DESCRIPTION OF THE DRAWINGS

Other objects, features and advantages of the present invention will be understood more fully from the following detailed description made with reference to the accompanying drawings. In the drawings:

FIG. 2 is a table of diagnosis trouble codes;

FIG. 4 is a drawing showing a combination pattern of the resistance values, diagnosis trouble codes and abnormality portions.

DETAILED DESCRIPTION OF THE PREFERRED EMBODIMENTS

Figure 1:
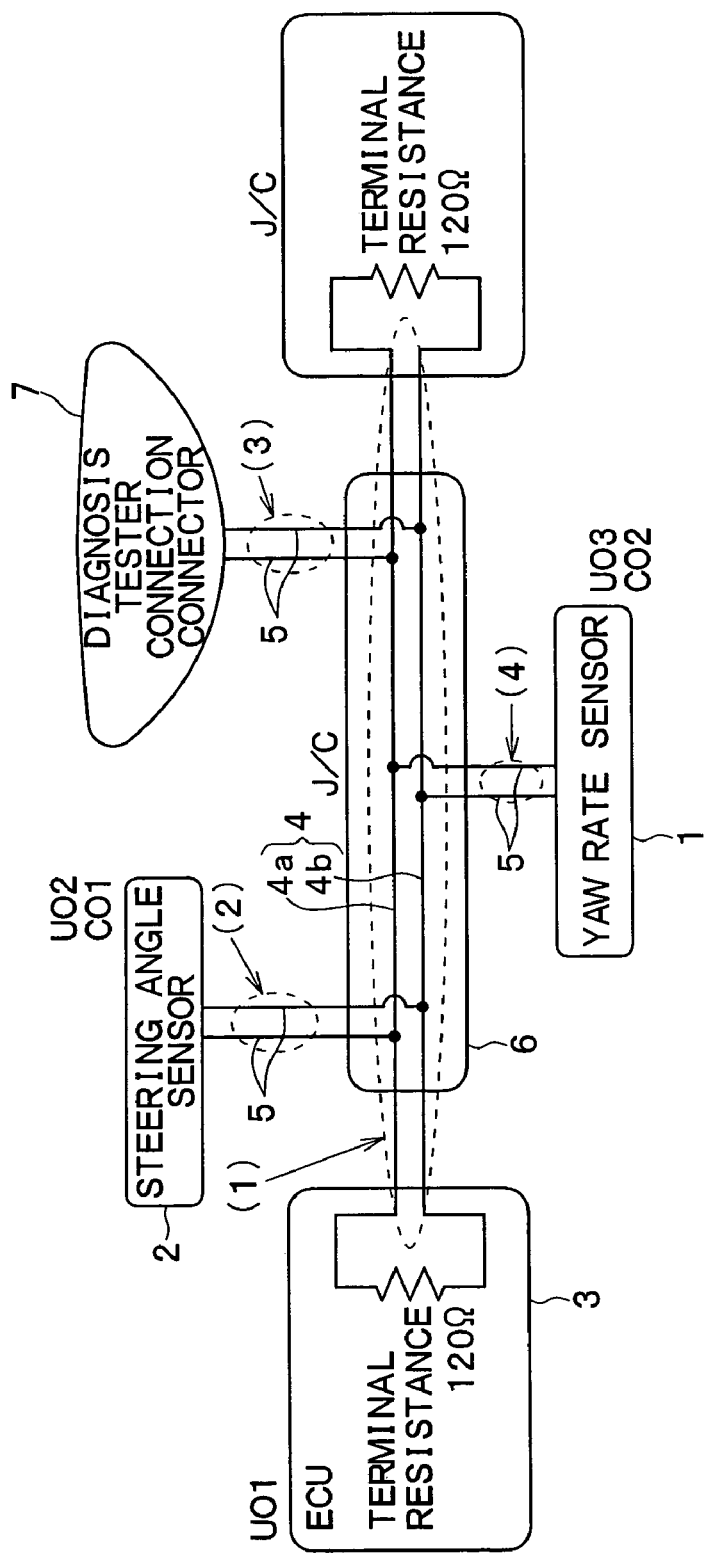
FIG. 1 is a schematic diagram of a communication network for a vehicle.

The present invention will be described further with reference to various embodiments in the drawings.

An embodiment of the present invention will be explained referring to drawings.

FIG. 1 is a schematic diagram of a communication network for a vehicle.

The embodiment is applied to a system (hereafter referred to as a vehicle stability control system for preventing lateral sliding) that controls a behavior of the vehicle so as to ensure stability while the vehicle is turning, for example. As shown in FIG. 1, in this embodiment, a communication network is constructed by various sensors 1, 2 and an ECU 3 being connected to a CAN bus.

The CAN bus, that is a multiplex communication line that carries communication data, includes main line configured with a CAN-H line 4a and a CAN-L line 4b (hereafter referred to as CAN bus main line 4) that are connected to two terminal resistance (120 Ω in the embodiment) and a branch line 5 that connects the CAN bus main line 4 and the various sensors 1, 2 or a diagnosis tester connection connector 7 that functions as a connector for measurement.

The various sensors 1, 2 are a yaw rate sensor 1 and a steering angle sensor 2 for detecting vehicle information, for example. They are connected to a J/C (junction connector) 6 through each branch line 5, and then connected to the CAN bus main line 4 via the J/C 6.

The ECU 3 is an electronic control device that controls the vehicle stability control system and configured from a general micro computer with a memory and the like. The ECU 3 is connected to the CAN bus main line 4, and has a failure diagnosis function (not shown) that performs a failure diagnosis based on a signal that is sent from the various sensors 1, 2. The failure diagnosis function is achieved by a failure diagnosis portion of the ECU 3. The failure diagnosis portion stores, in the memory, a diagnosis trouble code that differs depending on the failure state. Specifically, when an abnormality has occurred in the CAN bus communication, when the various sensors 1, 2 are malfunctioning, and when an abnormality such as disconnection or short circuit, or the like has occurred in the communication line from the CAN bus main line 4 to the branch line 5 that is connected to the various sensors 1, 2, the diagnosis trouble code corresponding to each case is stored in the memory.

FIG. 2 shows one example of a correlation between failure states and diagnosis trouble codes. As shown in this figure, diagnosis trouble codes are assigned for each case: U01 is assigned when malfunction in CAN communication occurs, U02 is assigned when malfunction in CAN communication with steering angle sensor 2 occurs, U03 is assigned when malfunction in CAN communication with the yaw rate sensor 3 occurs, CO1 is assigned when malfunction in the steering sensor 2 occurs, and CO2 is assigned when malfunction in the yaw rate sensor 3 occurs.

Next, a failure diagnosis method of a communication network will be explained.

In the embodiment, when an abnormality (failure) has occurred in the aforementioned communication network, a resistance value of the CAN bus main line 4 is measured, the diagnosis trouble code that is stored in the memory of the ECU 3 by the failure diagnosis portion is confirmed, and an abnormality portion is identified by combining the resistance value and the diagnosis trouble code.

The terminal resistance of 120 Ω is provided with the terminal position of the CAN bus main line 4, for example, each terminal portion of the ECU 3 and the J/C 6 as shown in FIG. 1. Therefore, the resistance value of the CAN bus main line 4 is obtained by measuring a resistance value between the CAN-H line 4a and the CAN-L line 4b, that is, a resistance value of a synthetic resistance that is formed by the terminal resistance. Specifically, the resistance value of the CAN bus main line 4 is measured by connecting an ohm meter, or the like to the diagnosis tester connection connector 7 that is connected to the CAN bus main line 4.

In this case, when the CAN bus main line 4 is in a normal state, each terminal resistance is connected in parallel to the diagnosis tester connection connector 7. Therefore, the resistance value to be measured is 60 Ω. However, when an abnormality such as disconnection, short circuit, or the like has occurred in the CAN bus main line 4 or the branch line 5 (including the branch line 5 that is connected to the diagnosis tester connection connector 7), the resistance value of the CAN bus main line 4 differs depending on the abnormality portion, therefore, the abnormality portion can be identified to some extent depending on the measured resistance value.

On the other hand, the diagnosis trouble code is confirmed by connecting a tester (not shown), or the like to the diagnosis tester connection connector 7, and viewing details that is stored in the memory of the ECU 3 by the failure diagnosis portion. Then, as shown in FIG. 2, since different diagnosis trouble codes (diagnosis codes) are set for an abnormality in the CAN bus communication, failure in the various sensors 1, 2, an abnormality (disconnection or short circuit) in the communication line from the CAN bus main line 4 to the branch line 5 that is connected to the various sensors 1, 2, an abnormality state can be confirmed by checking the diagnosis trouble code type.

Based on these methods, the resistance value of the CAN bus main line 4 is measured and the diagnosis trouble code is confirmed, and a failure diagnosis of the communication network is performed following the diagnosis procedure a) to b) below.

a) First, the resistance value of the CAN bus main line 4 is measured, and the abnormality portion is identified depending on the measured resistance value.

Figure 3:
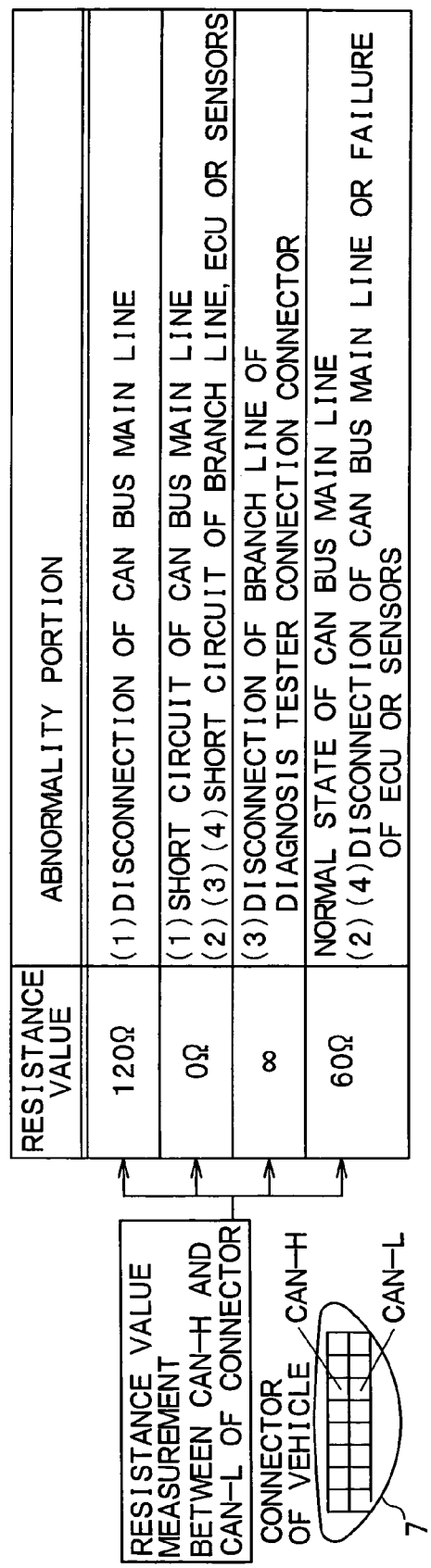
FIG. 3 is a diagram showing a relationship between resistance values of a CAN bus main line and abnormality portions.

Specifically, a correlation between the resistance value of the CAN bus main line 4 and a problem portion is set as shown in FIG. 3, based on which the abnormality portion is identified. Note that each problem as shown in (1) to (4) of FIG. 3 has occurred at the portion as shown in (1) to (4) of FIG. 1.

Resistance value 120 Ω—disconnection of the CAN bus main line 4

Resistance value 0 Ω—short circuit of the CAN bus main line 4, short circuit of the branch line 5, short circuit of the ECU 3 and the various sensors 1, 2

Resistance value ∞—disconnection of the branch line 5 that is connected to the diagnosis tester connection connector 7

Resistance value 60 Ω—disconnection of the branch line 5 that is connected to the various sensors 1, 2 (however, the CAN bus main line 4 is in a normal state.) Alternatively, failure of the various sensors 1, 2, or the ECU 3.

b) Confirmation is made whether the measured resistance value is any one of 120 Ω, 0 Ω, and ∞, or 60 Ω. Then, a procedure for the measured value is selected.

Here, the resistance value of the CAN bus main line 4 and diagnosis trouble codes has a relationship as shown in FIG. 4. As seen from the figure, when the resistance value is 120 Ω, an abnormality state is such that one of U01 to U03 has been output as the diagnosis trouble code; when the resistance value is 0 Ω, an abnormality state is such that a set of U01 to U03 has been already output as the diagnosis trouble code; and when the resistance value is ∞, a state is such that no diagnosis trouble code has been output.

For this reason, when the resistance value is 120 Ω, 0 Ω or ∞, it is possible to identify the abnormality state without confirming the diagnosis trouble code.

However, when the resistance value is 60 Ω, it is not possible to distinguish a case where the CAN bus main line 4 is in a normal state, a case where disconnection has occurred in the branch line that is connected to each sensor 1, 2 and a case where failure has occurred in the ECU 3 or the sensors 1, 2 themselves. In this case, it is necessary to confirm the diagnosis trouble code.

c) Therefore, when the measured resistance values are 120 Ω, 0 Ω and ∞, the abnormality portions that are identified are repaired, respectively. That is, when the resistance value is 120 Ω, the CAN bus main line 4 is repaired, when the resistance value is 0 Ω, each of sensors 1, 2 or the ECU 3 is removed one by one so as to identify and repair the portion of the short circuit, and when the resistance value is ∞, the branch line that is connected to the diagnosis tester connection connector 7 is repaired. Then, the resistance value of the CAN bus main line 4 is measured once again so as to confirm that the value shows the normal value of 60 Ω.

d) On the other hand, when the measured value is 60 Ω (including a case where the abnormality portion is repaired in process b) and the resistance value shows a normal value of 60 Ω), the diagnosis trouble code is confirmed by a tester. Here, if the diagnosis trouble code is not displayed on the tester, the state is regarded as "no abnormality in particular", and the failure diagnosis is completed.

When the measured resistance value is 60 Ω, and if the diagnosis trouble code related to the communication line is displayed, the abnormality portion is identified by the diagnosis trouble code (in this case, it is assumed that the branch line that is connected to the various sensors 1, 2 is disconnected).

In addition, other than diagnosis trouble codes related to the communication line, when the diagnosis trouble code related to the sensors 1, 2 such as C01, C02, or the like as shown in FIG. 2, it is possible to identify the failure of the sensors 1, 2 corresponding to the diagnosis trouble code.

As described above, when an abnormality (failure) has occurred in the communication network, by combining the resistance value of the CAN bus main line 4 and the diagnosis trouble code that is stored in the failure diagnosis portion of the ECU3, it is possible to distinguish an abnormality (disconnection or short circuit) in the CAN bus main line 4, an abnormality (disconnection or short circuit) of the branch line 5, or failure of the various sensors 1, 2 themselves. Accordingly, the abnormality portion in the communication network can be identified within a short period of time, thereby significantly reducing repair time.

In addition, according to the aforementioned method, the abnormality portion can be identified only by combining the resistance value of the CAN bus main line 4 and the diagnosis trouble code. Therefore, a need for providing another circuit for identifying the abnormality portion is eliminated, and the failure diagnosis for the communication network using the CAN bus (multiplex communication line) can be achieved with a low cost.

EXAMPLE OF MODIFICATION

In the aforementioned embodiment, it is described that an example where the resistance value of the CAN bus main line 4 is measured by the ohm meter. However, a function of measuring the resistance value may be provided with the tester that reads the diagnosis trouble code from the ECU 3. In this case, it is possible to realize a complete automatic failure diagnosis by the tester.

Moreover, if the aforementioned diagnosis procedure is programmed into the tester (a tool other than the tester is also acceptable), and a tester can be enabled to display the procedure, a user can perform the diagnosis method in accordance with the procedure displayed on the tester. Therefore, an interactive type automatic failure diagnosis with the tester is possible.

Note that the order in the procedure of the failure diagnosis may be reversed to the example as described in the embodiment (in which the diagnosis trouble code is investigated after the resistance value of the CAN bus main line 4 is measured). In other words, the resistance value of the CAN bus main line 4 may be measured after the diagnosis trouble code is investigated.

In the aforementioned embodiment, the failure diagnosis method of a communication network related to the vehicle stability control system for preventing lateral sliding is described. However, the failure diagnosis method of the present invention is not limited to the vehicle stability control system, and, needless to say, it can be applied to other control systems that are mounted on the vehicle.

Furthermore, in the aforementioned embodiment, the CAN bus is described as an example of the multiplex communication line, but it goes without saying that the failure diagnosis method of the present invention can be also applied to a communication network using the multiplex communication line (the next generation communication architecture such as TTCAN, TTP, FlexRay, byteflight) other than the CAN bus.

While the above description is of the preferred embodiments of the present invention, it should be appreciated that the invention may be modified, altered, or varied without deviating from the scope and fair meaning of the following claims.

What is claimed is:

1. A failure diagnosis method of a communication network for a vehicle having an electronic control device provided with a failure diagnosis portion and a plurality of electronic control instruments being connected to a main line of a multiplex communication line comprising the steps of:

storing different diagnosis trouble codes respectively, at the failure diagnosis portion of the electronic control device, when the electronic control instrument is malfunctioning, or when an abnormality including disconnection or short circuit has occurred in a communication line from the main line of the multiplex communication line to a branch line that is connected to the electronic control instrument;

measuring a resistance value of the main line resistance in the multiplex communication line; and identifying an abnormality portion in the communication network by a combination of the measured resistance value of the main line and the diagnosis trouble code that is stored in the failure diagnosis portion, wherein the measuring the main line resistance includes providing each terminal position of the main line of the multiplex communication line is provided in parallel with terminal resistance, connecting a connector for measurement to the main line of the multiplex communication line via the branch line, measuring the resistance value of the main line resistance via the connector for measurement, and determining, when the resistance value of the main line resistance is a synthetic resistance value when the terminal resistance is connected in parallel, either one of that no failure has occurred in the main line of the multiplex communication line or the branch line that is connected from the main line to the electronic control instrument are not malfunctioning, and that no failure has occurred in the main line of the communication line, but failure has occurred in the branch line that is connected from the main line of the multiplex communication line to the branch line that is connected to the electronic control instrument.

2. The failure diagnosis method of a communication network for a vehicle according to claim 1 wherein
the determining includes determining, when the resistance value of the main line resistance is one of the resistance values of the terminal resistance, failure due to disconnection has occurred in the main line of the multiplex communication line.

3. The failure diagnosis method of a communication network for a vehicle according to claim 1, wherein
the determining includes determining, when the resistance value of the main line resistance is 0, at least one of the following cases applies: short circuit of the main line of the multiplex communication line, short circuit of the branch line that is connected from the main line of the multiplex communication line to the electronic control instrument, and short circuit in the electronic control device.

4. The failure diagnosis method of a communication network for a vehicle according to claim 1 wherein
the determining includes determining, when the resistance value of the main line resistance is infinite, failure due to disconnection has occurred in the branch line that connects the connector for measurement and the main line of the multiplex communication line.

* * * * *